(12) United States Patent
Roelver

(10) Patent No.: US 9,074,558 B2
(45) Date of Patent: Jul. 7, 2015

(54) CENTRIFUGAL PRECIPITATOR FOR PRECIPITATING OIL MIST FROM THE CRANKCASE VENTILATION GAS FROM AN INTERNAL COMBUSTION ENGINE

(75) Inventor: Martin Roelver, Havixbeck (DE)

(73) Assignee: Hengst SE & Co. KG, Muenster (DE)

( * ) Notice: Subject to any disclaimer, the term of this patent is extended or adjusted under 35 U.S.C. 154(b) by 53 days.

(21) Appl. No.: 14/119,507

(22) PCT Filed: May 14, 2012

(86) PCT No.: PCT/EP2012/058861
§ 371 (c)(1),
(2), (4) Date: Nov. 22, 2013

(87) PCT Pub. No.: WO2012/159909
PCT Pub. Date: Nov. 29, 2012

(65) Prior Publication Data
US 2014/0069398 A1 Mar. 13, 2014

(30) Foreign Application Priority Data
May 25, 2011 (DE) .......................... 10 2011 076 465

(51) Int. Cl.
| | |
|---|---|
| *B04B 15/02* | (2006.01) |
| *F02M 25/06* | (2006.01) |
| *B01D 45/14* | (2006.01) |
| *B04B 5/00* | (2006.01) |
| *B04B 5/12* | (2006.01) |
| *B04B 7/02* | (2006.01) |
| *F01M 13/04* | (2006.01) |

(52) U.S. Cl.
CPC ............... *F02M 25/06* (2013.01); *B01D 45/14* (2013.01); *B04B 5/005* (2013.01); *B04B 5/12* (2013.01); *B04B 7/02* (2013.01); *F01M 2013/0422* (2013.01)

(58) Field of Classification Search
CPC .......... F01M 2013/0422; F01M 13/04; F01M 13/022
USPC .......................... 123/572–574, 41.86; 55/447
See application file for complete search history.

(56) References Cited

U.S. PATENT DOCUMENTS

| | | | |
|---|---|---|---|
| 6,783,571 B2 * | 8/2004 | Ekeroth | 95/8 |
| 7,338,546 B2 * | 3/2008 | Eliasson et al. | 55/406 |

(Continued)

FOREIGN PATENT DOCUMENTS

| | | |
|---|---|---|
| GB | 2317203 | 3/1998 |
| WO | 2010051994 | 5/2010 |

OTHER PUBLICATIONS

International Search Report, Apr. 27, 2012.

*Primary Examiner* — Marguerite McMahon
(74) *Attorney, Agent, or Firm* — Greer, Burns & Crain Ltd.

(57) ABSTRACT

A centrifugal precipitator having a housing and a rotatable driven rotor for precipitating oil mist from crankcase ventilation gas of an internal combustion engine. The housing has an inlet for gas to be deoiled, a deoiled gas outlet and an oil outlet. The housing includes a metallic main element surrounding the rotor and carrying the rotor bearing. A housing bottom is built onto the main element from below. The housing attaches with a flange to a counterflange or module of the engine. The housing flange is formed on the main element and the housing. The oil outlet runs through a first flange part of the housing bottom and this flange part has a circumferential rim. A second flange part of the main element has a collar engaging over part of its periphery behind the rim and can be clamped with the rim in between against the counterflange.

16 Claims, 5 Drawing Sheets

(56) References Cited

U.S. PATENT DOCUMENTS

| | | |
|---|---|---|
| 7,731,772 B2 * | 6/2010 | Lagerstedt et al. ............. 55/407 |
| 7,824,459 B2 * | 11/2010 | Borgstrom et al. ............. 55/406 |
| 7,875,098 B2 * | 1/2011 | Hallgren et al. ................... 95/1 |
| 2008/0264251 A1 | 10/2008 | Szepessy |
| 2011/0011380 A1 | 1/2011 | Lagerloef |
| 2011/0281712 A1 | 11/2011 | Schlamann et al. |
| 2012/0174545 A1 * | 7/2012 | Tornblom et al. ............... 55/447 |
| 2012/0174547 A1 * | 7/2012 | Tornblom et al. ............... 55/461 |

* cited by examiner

CENTRIFUGAL PRECIPITATOR FOR PRECIPITATING OIL MIST FROM THE CRANKCASE VENTILATION GAS FROM AN INTERNAL COMBUSTION ENGINE

CROSS-REFERENCES TO RELATED APPLICATIONS

This application claims the benefit of the German patent application No. 10 2011 076 465.8 filed on May 25, 2011, the entire disclosures of which are incorporated herein by way of reference.

BACKGROUND OF THE INVENTION

The present invention relates to a centrifugal precipitator for precipitating oil mist from the crankcase ventilation gas of an internal combustion engine, the centrifugal precipitator having a housing, a drivable rotor mounted rotatably therein, and a rotational drive for the rotor, the housing having a crude gas inlet for crankcase ventilation gas that is to be deoiled, a pure gas outlet for deoiled crankcase ventilation gas, and an oil outlet for oil precipitated from the crankcase ventilation gas, the housing having a multipart construction with a main element that surrounds the rotor and that holds the bearing thereof, having a housing cover containing the rotational drive, and having a housing floor built onto the main element from below, through which at least the oil outlet runs, and the housing being capable of being mounted by a flange onto a counterflange of the associated internal combustion engine or of a module forming part of the associated internal combustion engine.

A centrifugal precipitator of the type indicated above is known from WO 2010/951 994 A1. Here it is essential that the centrifugal precipitator has an electric motor as a rotor drive and has means for cooling the electric motor, at least one cooling element preferably being provided as a means for cooling the electric motor. Preferably, the housing has a lower part having an inlet for crude gas that is to be supplied for the rotor, and having an outlet for oil precipitated from the crude gas, the lower part being capable of being produced as a separate individual part, and being capable of being connected to the rest of the housing in various rotational positions relative thereto, preferably by welding or by being plugged together. The centrifugal precipitator can be equipped with a connecting flange with which it can be flange-mounted onto a module base, in particular of an oil filter module, or onto a cylinder head cover of the internal combustion engine, some or all of the required flow connections from and to the internal combustion engine running through the connecting flange.

In this known centrifugal precipitator, it is regarded as disadvantageous that it has a relatively heavy weight, because in order to achieve the necessary mechanical stability its housing is made up to the largest possible extent of metal, in particular aluminum. Due to the complex routing of the crude gas, pure gas, and precipitated oil inside the precipitator, it is necessary for the housing to have a multipart construction. Such a housing made of a plurality of metal parts is relatively expensive to manufacture, in particular if various connection interfaces, such as connecting pieces and flanges, are present in and on the housing, which have to be processed separately by machining, which is expensive.

SUMMARY OF THE INVENTION

Therefore, the object of the present invention is to create a centrifugal precipitator of the type named above that avoids the indicated disadvantages and that has as low a weight as possible with high mechanical stability, and that can be produced economically and installed easily.

According to the present invention, this object is achieved by a centrifugal precipitator of the type named above that is characterized in that the flange is fashioned on the main element and on the housing floor, and that the oil outlet runs through a flange part allocated to the housing floor, and this flange part has a circumferential rim, and that a flange part allocated to the main element has a collar that engages behind the rim over at least a part of its circumference and that can be clamped against the counterflange with interposition of the rim.

The present invention advantageously brings it about that the carrying off of the oil precipitated from the crankcase ventilation gas during operation of the centrifugal precipitator is accomplished easily and along the shortest possible path. In addition, it is particularly advantageous that for the clamping of the flange part allocated to the housing floor, the flange part, allocated to the main element, of the common flange is used. This makes the attachment of the precipitator to the internal combustion engine or to the module particularly simple. The flange part of the housing floor is relieved of clamping forces for the flange connection. All clamping forces are received by the flange part allocated to the main element. The flange part of the housing floor is passively clamped with its rim between the collar and the counterflange. Because the main element on the one hand and the housing floor on the other hand are individual parts that can be manufactured separately, these can be made of different materials, and in particular a lighter material can be used for the housing floor than for the main element, contributing to a lower weight of the precipitator as a whole.

A particularly low weight is achieved if the housing floor, including its flange part with the circumferential rim, is made of plastic. In addition, given the use of a suitable plastic a separate flange seal can here be done without, because the material of the housing floor itself then forms the seal.

If the plastic of which the rim is made is not suitable for use as a sealing material, or if a particularly high degree of security against leakage is desired, then it is usefully provided that a seal is situated between the rim and the counterflange, in order to ensure the leak tightness of the flange connection. This seal can be for example an elastomer ring.

A preferred development proposes that the flange part allocated to the housing floor has an outline whose basic shape is rectangular, and that the collar has a fork shape, open at one side, and engages the rim from behind at at least two of its four sides. In this way, the engagement of the collar of the main element with the rim of the housing floor can be produced particularly easily, and can easily be detached as needed.

Here, it is further provided that the collar is open at its side that is the lower side in the installed position of the precipitator, and that the housing floor, for its connection with the main element, can be placed onto the main element from the open side of the collar, parallel to the plane of the flange. With this embodiment, a particularly simple connection of the main element and housing floor is achieved, because at the same time as their connection to one another the collar is also brought into its proper position for engagement with the rim.

A particularly advantageous and rapid assembly results if the main element and the housing floor have sealing elements that work together and are mutually axially and/or radially sealing, and the housing floor can be clamped axially against the main element by a central screw.

Due to the fact that the crude gas inlet preferably runs through the housing floor, a further savings of weight is possible, because the main element can then be realized more easily and simply.

In order to avoid an undesirable flow of gas through the oil outlet against the direction of oil flow, it is provided that a check valve is situated in the housing floor, in the course of the oil outlet. The check valve always closes the oil outlet when pressure conditions are present under which the mentioned undesirable gas flow could occur.

The centrifugal precipitator according to the present invention is suitable, inter alia, for truck engines. In many known truck engines, a main oil filling port is accessible only after tilting the driver cab forward, which is laborious. In order to remedy this, the present invention provides that an oil refill channel runs through the housing floor that can be connected on the one hand to an external oil filling port, and on the other hand is connected in terms of flow to the segment of the oil outlet running through the flange part. When the centrifugal precipitator is put in place and is connected to the external oil filling port, accessible from outside the truck, a refilling of smaller quantities of oil, the so-called daily oil filling, into the internal combustion engine is advantageously possible through the oil filling port and through the housing floor of the centrifugal precipitator, without the driver's cab having to be tilted for this purpose.

The present invention further provides that the collar has an inward-pointing pressure rib whose side facing the flange, in the state in which the housing floor is installed on the main element, is seated on the side of the rim of the housing floor facing away from the flange. Here, the side of the pressure rib facing the flange is at a distance from the flange plane such that, in the state where the precipitator is clamped against the counterflange, the rim of the housing floor is pressed against the counterflange with sufficient force, but not excessively strongly. Here, the collar simultaneously surrounds the rim radially externally at least over a part of its circumference, so that in the clamped state the rim cannot escape there in the direction of the flange plane.

In particular for reasons of rapid and simple installation of the precipitator on the associated internal combustion engine, or the associated module, the present invention further provides that in the collar there is made a plurality of bores for clamping screws for attaching the precipitator to the counterflange, and that when the housing floor is installed on the main element, imaginary axial prolongations of the bores run away in the direction of the flange, external to the housing floor. The introduction of the clamping screws into the bores and the use of screwdriving tools is therefore not prevented by the housing floor.

In order to ensure an operationally reliable and long-lasting sealing tightness of the flange connection between the precipitator on the one hand and the internal combustion engine or module on the other hand, the present invention further proposes that the collar be fashioned as a three-dimensional structure having reinforcing webs running in various directions. Through the fashioning indicated here of the collar, the collar becomes inherently particularly rigid and therefore capable of bearing high mechanical loads, and warpage of the collar, resulting in lack of leak tightness of the flange connection, is avoided.

For an effective precipitation of oil mist, in particular fine and very fine oil particles, from the crankcase ventilation gas, a high rotational speed of the rotor is essential. In order to achieve this, the rotational drive for the rotor is preferably formed by an electric motor.

Finally, the present invention proposes for the centrifugal precipitator a crankcase pressure regulating valve that is situated in the run of the pure gas outlet and is connected to the housing or built into the housing. In this way, with small outlay of constructive space and assembly, a further function necessary for the operation of the associated internal combustion engine can be integrated into the centrifugal precipitator.

As mentioned above, the main element and the housing floor are individual parts that can be manufactured separately, offering the advantageous possibility of producing each component from a separate functionally appropriate material. The main element is usefully made of a more stable material, such as metal, so that it can accept higher mechanical loads resulting in particular from the rotation of the rotor with a high rotational speed and from the clamping against the counterflange. The housing floor is not subject to these mechanical loads, so that it can be made, without disadvantages, of a plastic that is less stable but is advantageously lighter and lower in cost. At the same time, the plastic material offers the advantage that the housing floor inherently has a certain movability that is useful for compensating dimensional tolerances during the connection of the housing floor to the main element on the one hand and to the counterflange on the other.

Particularly preferably, the main element is a pressure die-cast part made of light metal, in particular aluminum. In this embodiment, the main element is on the one hand capable of accepting mechanical loading, but on the other hand is nonetheless relatively low in weight and is capable of being produced at very low cost as a mass-produced part.

Particularly preferably, the housing floor is an injection-molded part made of thermoplastic, in particular polyamide (PA). This material is well suited for the mechanical and thermal loads that occur, and has low weight and advantageous material costs. Advantageously, in plastic injection molding the housing floor, with all necessary connections, can be produced in one piece off-tool, i.e. without post-processing. In this way, a low-cost production of the housing floor as a mass-produced part is also possible.

In addition, through the production of various housing floors and through the installation of the various housing floors on identical main elements, different embodiments of the centrifugal precipitator having different connections can be realized with a low outlay, thus making available an advantageous modular system.

BRIEF DESCRIPTION OF THE DRAWINGS

In the following, an exemplary embodiment of the present invention is explained on the basis of a drawing.

DETAILED DESCRIPTION OF THE PREFERRED EMBODIMENTS

Figure 1:
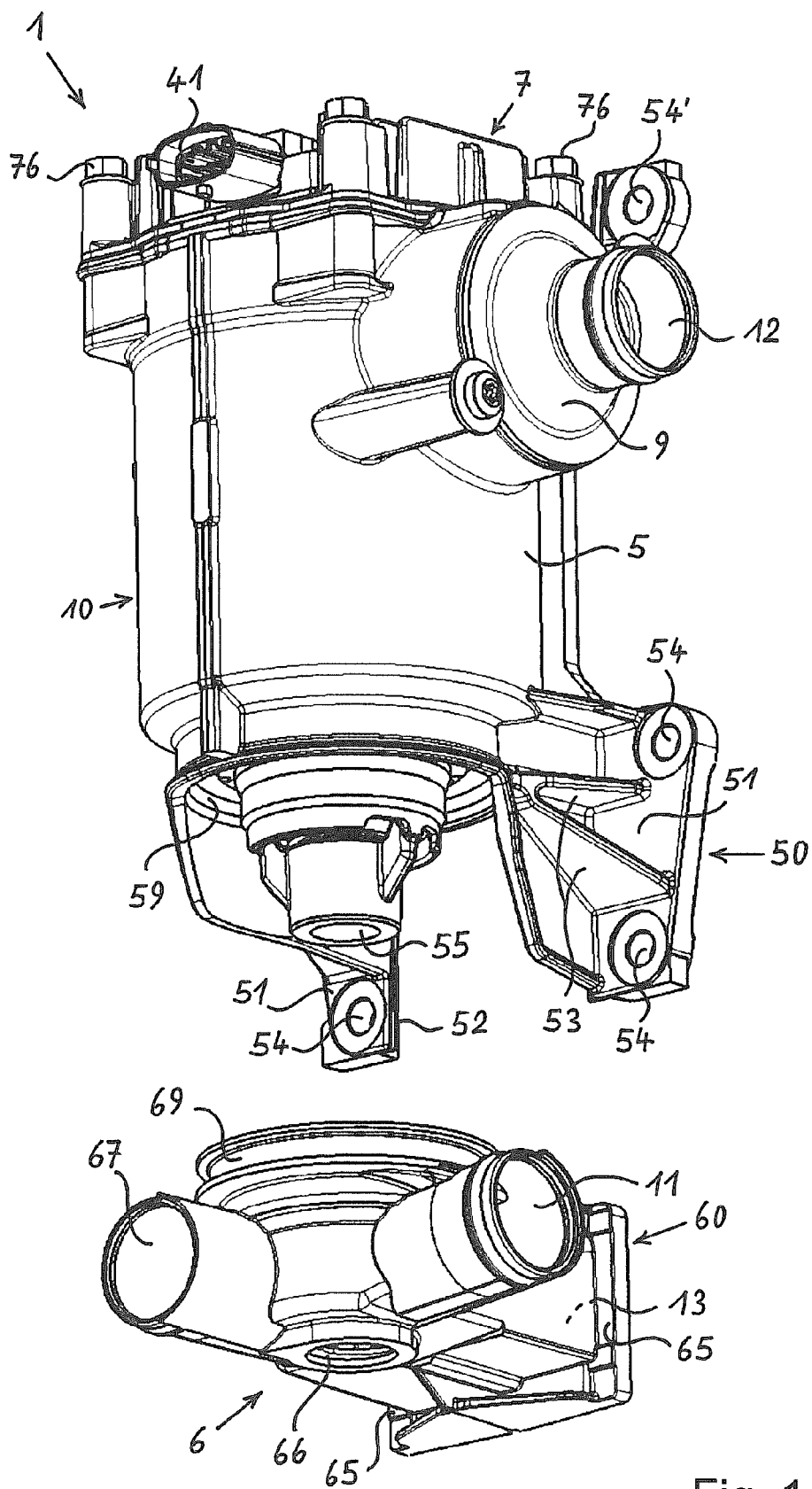
FIG. 1 shows an oil mist precipitator with a housing floor not yet attached, in a perspective view.

The upper part of FIG. 1 of the drawing shows, in a perspective view, a centrifugal precipitator 1 having a housing 10, and the lower part of the Figure shows an associated housing floor 6 not yet connected to the rest of centrifugal precipitator 1.

Centrifugal precipitator 1 has housing 10, which forms a main element 5 of precipitator 1. At the upper side, housing 10 is sealed by a cover 7 that is detachably connected to housing 10 by screws 76. Cover 7 here forms a cooling element for an electric drive of a centrifugal rotor (not visible here) situated in the interior of housing 10. For the supply of electric energy, cover 7 has, on its side facing the observer, a power connection 41, here in the form of a connecting socket.

At the side of housing 10 pointing to the right, there is situated a crankcase pressure regulating valve 9 whose housing is made at least partly integrally with housing 10 of centrifugal precipitator 1. On crankcase housing pressure regulating valve 9 there is situated a pure gas outlet 12, here in the form of a hose connection piece through which crankcase ventilation gas purified in centrifugal precipitator 1 leaves centrifugal precipitator 1, and is preferably guided to the intake tract of an associated internal combustion engine.

On its lower side, housing 10 of centrifugal precipitator 1 is still open toward the top in the representation shown in FIG. 1. In a central part of the lower region of housing 10, there is situated a lower bearing for centrifugal rotor 2 (not shown here). A central threaded bore 55 is directed downward and accepts a central screw for fastening housing floor 6 to the rest of housing 10.

On the side of centrifugal precipitator 1 facing away from the observer, on the main element 5 thereof there is provided a flange part 50 that is formed essentially by a fork-shaped collar 51 that is situated in a vertical plane and is downwardly open. On its inward-pointing edges, collar 51 is fashioned with a pressure rib 52. A plurality of bores 54 are provided in collar 51 that accept fastening screws with which centrifugal precipitator 1 can be clamped against a counterflange (not shown here) on an internal combustion engine, for example on the engine block thereof, or on a module forming part of the internal combustion engine. Further bores 54' for clamping screws are situated in the upper part of main element 5.

In order to complete the assembly of centrifugal precipitator 1, housing floor 6 is moved upward in the vertical direction. In this way, housing floor 6 comes into sealing engagement with housing 10. For the sealing, floor 6 has on its upper edge a circumferential sealing annular groove 69 into which a sealing ring (not shown here) can be placed. As a counterpiece thereto, housing 10 has, on its lower inner circumferential region, an annular sealing surface 59. A bore 66 runs centrally through floor 6, and a central screw (not shown here) can be guided through this bore into threaded bore 55.

On its side facing the observer in FIG. 1, housing floor 6 has a flange part 60 that is limited by a circumferential rim 65. Through this flange part 60 there runs an oil outlet 13 through which, during operation of centrifugal precipitator 1, oil precipitated from the crankcase ventilation gas can be led out from precipitator 1, in particular into the oil pan of the associated internal combustion engine.

When housing floor 6 is attached to the rest of centrifugal precipitator 1, flange part 60 of floor 6 is guided into flange part 50 of main element 5 from below, after which fork-shaped collar 51 of flange part 50 then engages rim 65 of flange part 60 from behind.

Housing floor 6 here has two connections, namely a crude gas inlet 11 through which crankcase ventilation gas that is to be deoiled can be introduced into centrifugal precipitator 1, as well as an oil refill channel 67 that can be connected to an external oil filling port (not shown here).

Figure 2:
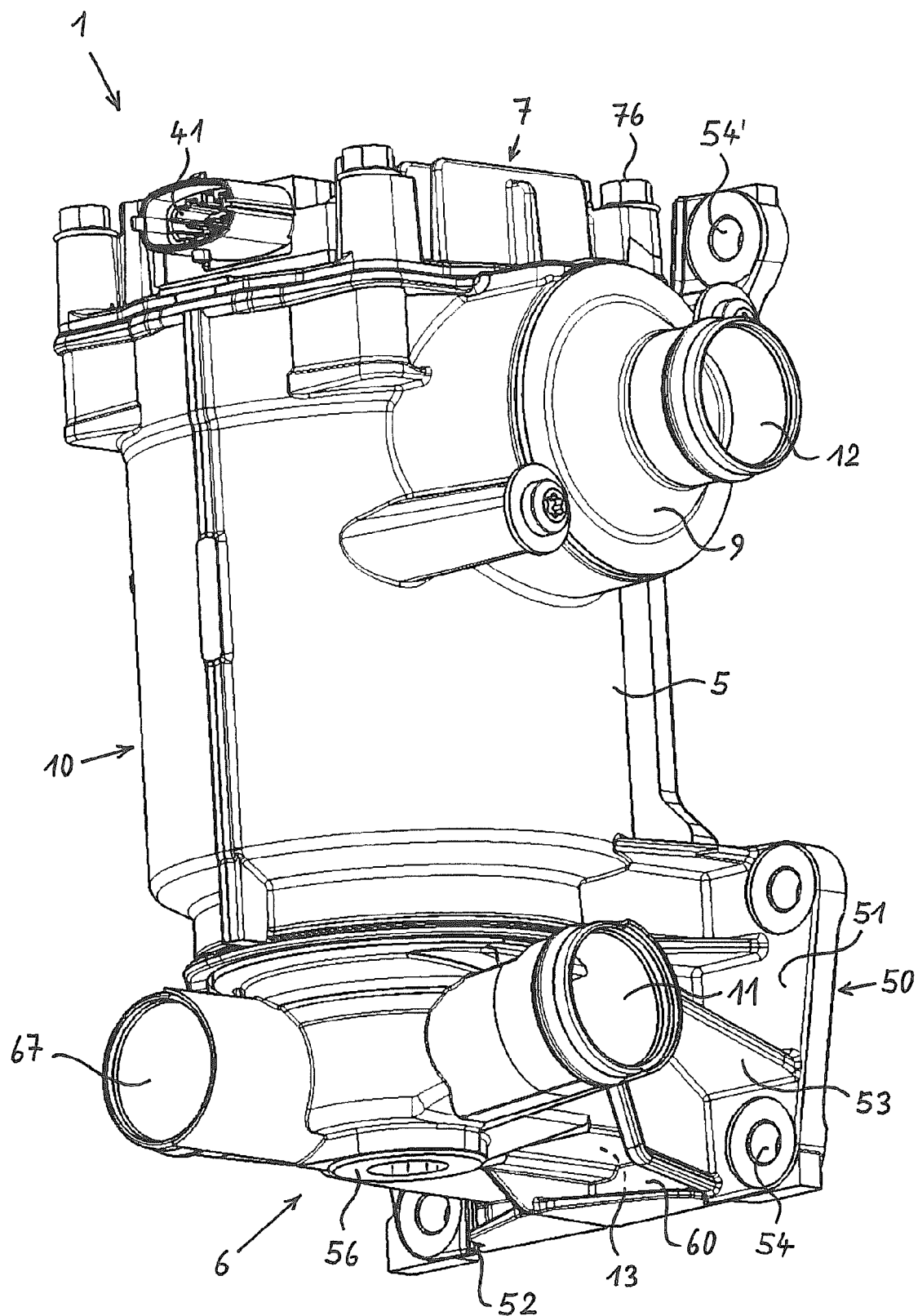
FIG. 2 shows the oil mist precipitator of FIG. 1 with attached housing floor, in the same view as in FIG. 1.

In FIG. 2, housing floor 6 is connected to the rest of centrifugal precipitator 1. In order to connect the two parts to one another, central screw 56 is now guided through floor 6 from below and is screwed to housing 10. Collar 51 of flange part 50 now engages rim 65 of flange part 60 from behind over its entire axial height.

With regard to the further parts and reference characters in FIG. 2, reference is made to the description of FIG. 1.

Figure 3:
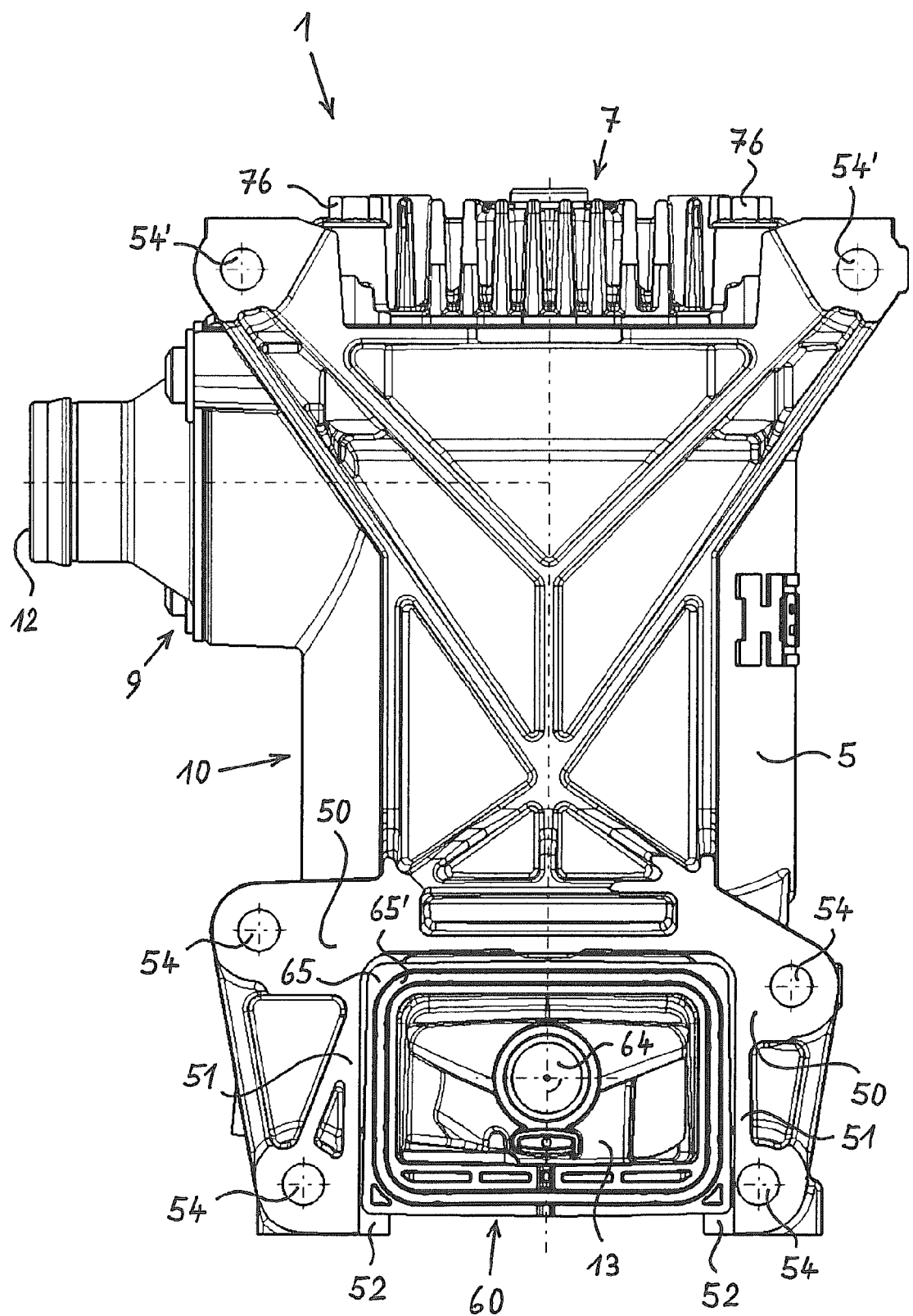
FIG. 3 shows the oil mist precipitator of FIG. 2 with attached housing floor, in a view of its side having a connecting flange.

FIG. 3 shows centrifugal precipitator 1 of FIG. 2, now in a view of its rear side on which flange parts 50 and 60 lie.

In the upper part of FIG. 3, main element 5 with housing 10 and upper cover 7 and fastening screws 76 thereof are visible. At left at FIG. 3, crankcase pressure regulating valve 5, with pure gas outlet 12, is visible.

In the lower part of FIG. 3 there is situated the flange of precipitator 1, made up of the two flange parts 50 and 60. Here, of housing floor 6 only flange part 60 thereof can be seen; in the region thereof, somewhat in the background, there is situated a check valve 64. The function of check valve 64 is explained further on the basis of FIG. 4.

Flange part 60 has circumferential rim 65 in or on which there is situated a circumferential sealing ring 65'.

On its left, upper, and right edge, flange part 60 is engaged from behind in the region of its rim 65 by downwardly open fork-shaped flange part 50, or more precisely by collar 51 thereof. Here, pressure rib 52 of collar 51 is situated behind rim 65, as can be seen in particular at the lower edge of flange part 60.

Figure 4:
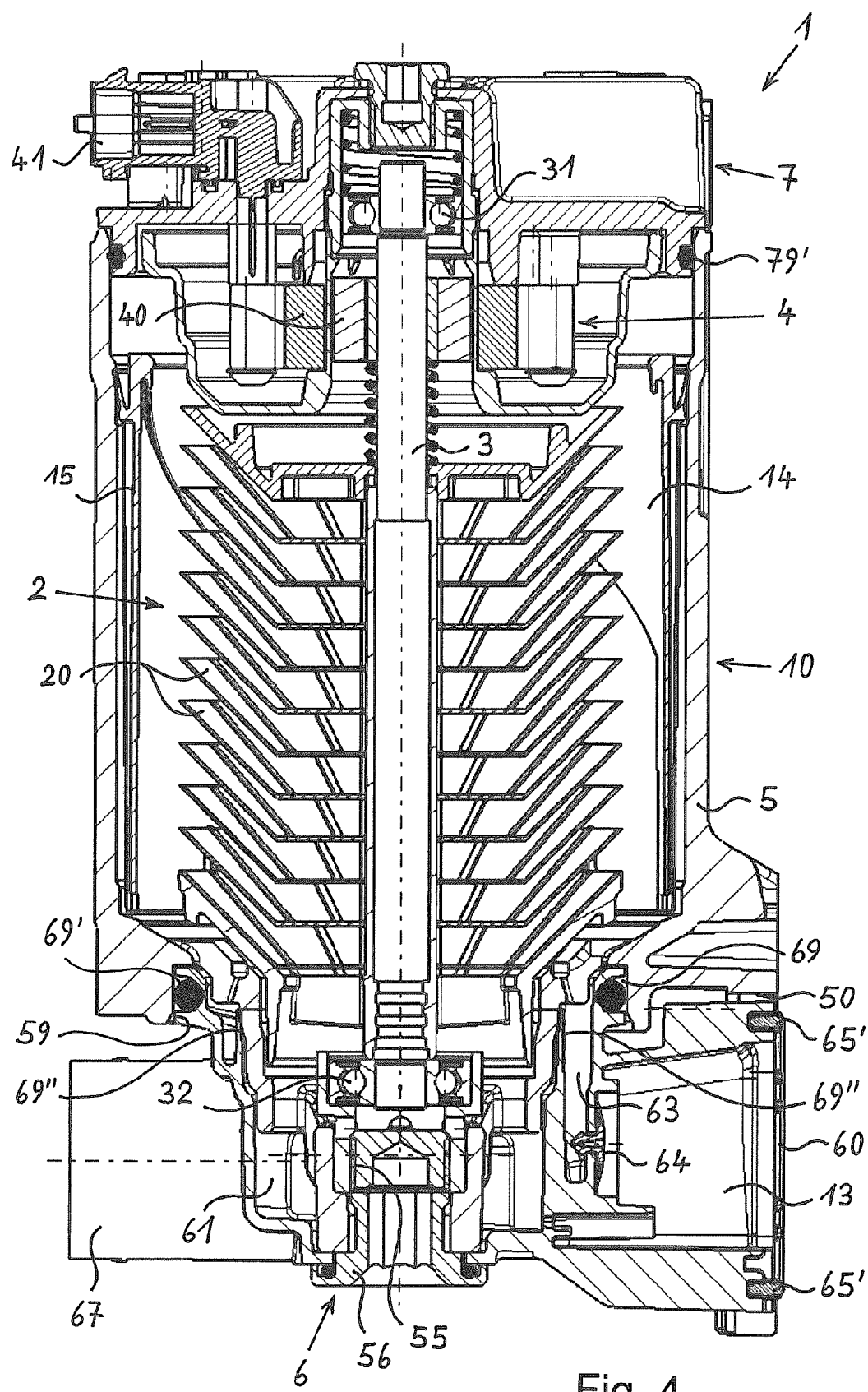
FIG. 4 shows the oil mist precipitator of FIGS. 2 and 3 in a vertical longitudinal section.

Opposite flange part 60, offset outward, bores 54 are situated in flange part 50. Two further fastening bores 54' for the assembly of centrifugal precipitator 1 are situated in the upper region thereof FIG. 4 shows a centrifugal precipitator 1 of FIGS. 2 and 3, in a longitudinal section. The central region of centrifugal precipitator 1 is formed by the main element 5 thereof with housing 10. In the interior thereof, there is situated centrifugal rotor 2, formed here by a stack of conical plates 20. Rotor 2 is situated on a shaft 3 so as to be secure against rotation, and the shaft is rotatably mounted in a first, upper bearing 31 and in a second, lower bearing 32. A bearing seat for upper bearing 31 is situated in a metallic sleeve in housing cover 7, and the lower bearing is situated in a metallic sleeve in main element 5, the sleeves preferably being made of steel. Both housing cover 7 and main element 5 are preferably pressure die-cast parts made of light metal such as aluminum or magnesium.

At the top, housing 10 is sealed in gas-tight fashion by cover 7, sealing ring 79' being situated between housing 10 and cover 7 for this purpose. Cover 7 has a rotational drive 4, here in the form of an electric motor 40, for centrifugal rotor 2. At the upper left in FIG. 4, connecting socket 41 is visible for the supply of electric energy to motor 40.

Housing 10, which at first is downwardly open, of main element 5 is sealed by housing floor 6, which is pushed into main element 5 from below in the axial direction, and is fastened by central screw 56, screwed into threaded bore 55. For mutual sealing, there is a sealing ring 69' that is placed into sealing ring groove 69 of floor 6 and that works together in sealing fashion with sealing surface 59 of main element 5.

At the right in FIG. 4 there is situated the flange with flange parts 50 and 60, to which centrifugal precipitator 1 can be connected, mechanically and in terms of flow for the precipitated oil, to the associated internal combustion engine or to a module belonging to the internal combustion engine. Sealing ring 65' provides the seal for this connection.

At lower left in FIG. 4, oil refilling channel 67 is visible, in the form of a connecting port.

During operation of centrifugal precipitator 1, a crankcase ventilation gas that is to be deoiled flows through crude gas inlet 11, situated in front of the sectional plane, first into a crude gas annular channel 61 in housing floor 6, and from there in the axial direction upward into the radial inner region of centrifugal rotor 2 situated in a gas purification chamber 14. Through the rotation thereof, the gas, loaded with oil droplets, is accelerated outward in the radial direction, causing the oil droplets carried along in the gas to precipitate onto the surfaces of plates 20. Due to centrifugal forces, the collected oil droplets are accelerated onto the inner circumference of housing 10, where an oil conducting insert 15 ensures that the centrifuged oil is conducted downward.

The deoiled gas leaves gas purification chamber 14 through pure gas outlet 12 (not shown in FIG. 4). The precipitated oil flows on the inner surface of oil conducting insert 15 downward into an oil collecting channel 63 formed integrally on housing floor 6 and upwardly open, which is radially outwardly sealed relative to main element 5 by sealing ring 69' and is radially inwardly sealed relative to main element 5 by a sealing lip 69" injection-molded onto housing floor 6. If corresponding pressure conditions are present, the oil runs through check valve 64 into oil outlet 13, which runs through flange part 60. Check valve 64 is always open when a greater pressure prevails on the side of oil collecting channel 63 than on the side of oil outlet 13. If, under certain operating conditions of the associated internal combustion engine, a higher pressure is present in oil outlet 13 than in oil collecting channel 63, check valve 64 then closes and prevents an undesired flow of gas through oil outlet 13 into gas purification chamber 14.

Figure 5:
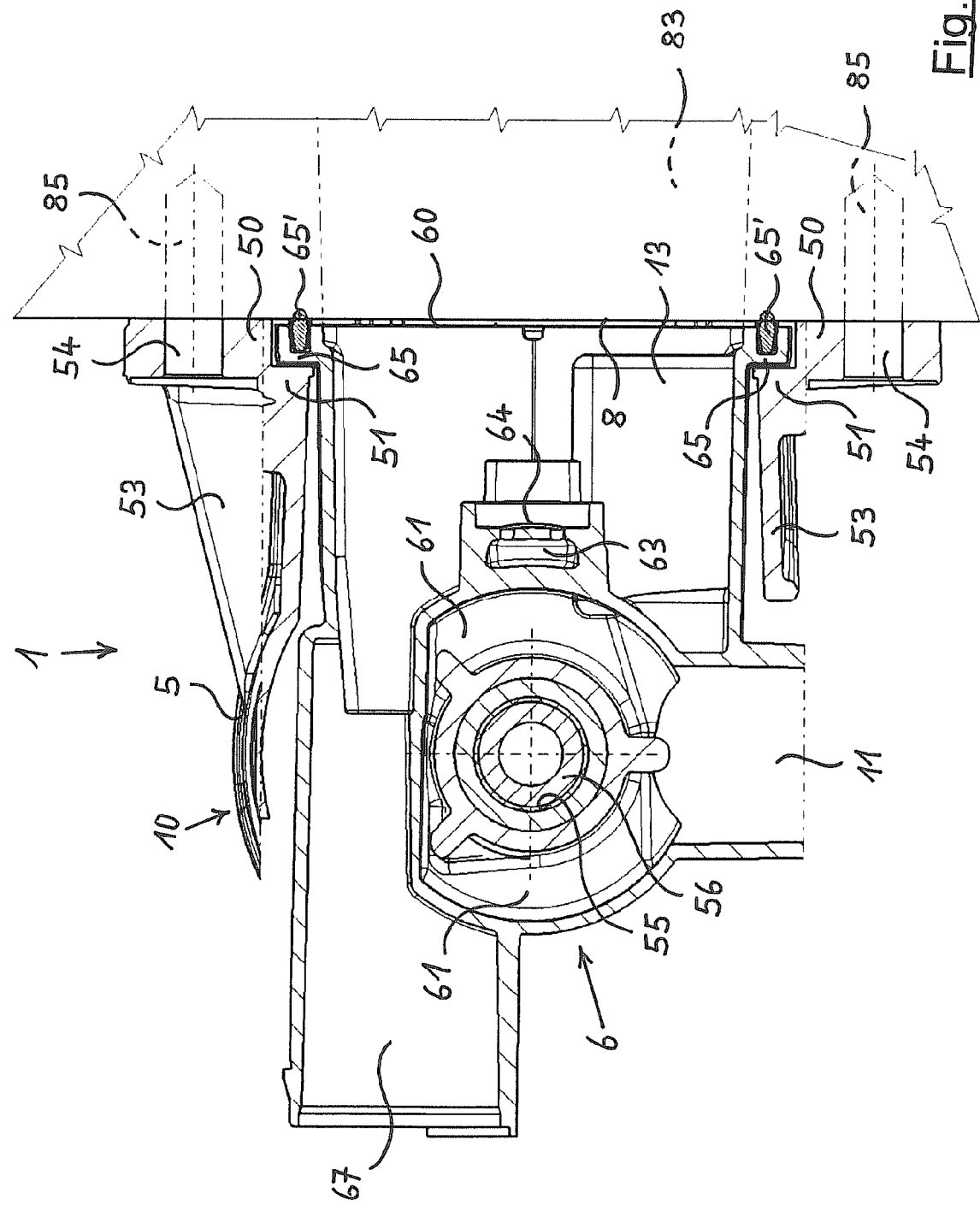
FIG. 5 shows the oil mist precipitator of FIGS. 2 and 3 in a state attached to a counterflange, in a horizontal cross-section at the level of the housing floor.

FIG. 5 shows centrifugal precipitator 1 of FIGS. 2 through 4 in a horizontal cross-section at the level of housing floor 6 and of flange 50, 60. In the center of FIG. 5, central screw 56, screwed into threaded bore 55, is sectioned. At the left and right thereof there runs crude gas annular channel 61. In FIG. 5, crude gas inlet 11 opens from below into crude gas annular channel 61.

At the left in FIG. 5, oil refilling channel 67 is visible, connected in terms of flow to oil outlet 13. When centrifugal precipitator 1 is installed on an internal combustion engine, oil refilling channel 67 is connected to an outer oil filling port (not shown here) that is used to refill smaller quantities of oil, the so-called daily oil filling, to the internal combustion engine. Here it is not required that the main oil filling port, which is often situated so as to be covered, be made accessible, which would require for example a tilting forward of the driver cab of a truck.

In the region of oil outlet 13, a part of oil collection channel 63 can be seen, which is connected in terms of flow to oil outlet 13 via check valve 64.

In FIG. 5, flange parts 50 and 60 of main element 5 and housing floor 6 are situated on the right side of centrifugal precipitator 1, and are here shown in a state in which they are connected to a counterflange 8. Counterflange 8 can for example be situated immediately on the engine block of an associated internal combustion engine or on a module, belonging to the associated internal combustion engine, that contains further components. An oil outlet channel 83, which usefully leads to the oil pan of the associated internal combustion engine, runs through counterflange 8. In the region of flange part 50, reinforcing webs 53 thereof are partly visible.

In addition to oil outlet 13, one or more further channels can also be guided through flange parts 50 and 60 and through counterflange 8, e.g. for crude gas inlet 11 and/or for pure gas outlet 12.

Flange part 60 is a part of housing floor 6, and in the depicted example contains oil outlet 13. On its outer edges, which here describe a rectangle, flange part 60 has rim 65, which bears sealing ring 65' on its side pointing toward counterflange 8.

Flange part 50 is a part of main element 5, which is made of metal, and with its collar 51 engages rim 65 of housing floor 6 from behind, the housing floor usefully being a plastic part. In this way it is achieved that when clamping screws are screwed through bores 54 into threaded bores 85 in counterflange 8, flange part 50 presses flange part 60 against counterflange 8 and clamps it there in gas-tight and liquid-tight fashion. Here, flange part 60 does not require any clamping screws of its own. The dimensions of rim 65 and of collar 51 are matched to one another in such a way that rim 65 is pressed against counterflange 8 with sufficient force and sealing tightness, but without risk of damage.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS

1 centrifugal precipitator
10 housing
11 crude gas inlet
12 pure gas outlet
13 oil outlet
14 gas purification chamber
15 oil conducting insert
2 rotor
20 plate
3 shaft
31 first bearing
32 second bearing
4 rotational drive
40 electric motor
41 power connection for 40
5 main element
50 flange part on 5
51 collar
52 pressure rib
53 reinforcing webs
54 bores in 50
54' bores at top in 5
55 central threaded bore in 5
56 central screw
59 sealing surface for 69'
6 housing floor
60 flange part on 6
61 crude gas annular channel
63 oil collection channel
64 check valve
65 rim on 60
65' sealing ring in 65
66 central bore in 6
67 oil refilling channel
69 sealing ring groove
69' sealing ring in 69
69" sealing lip on 6
7 housing cover
76 screws 79' sealing ring on 7
8 counterflange
83 oil outlet channel in 8
85 threaded bores in 8
9 crankcase pressure regulating valve

The invention claimed is:

1. A centrifugal precipitator for the precipitation of oil mist from the crankcase ventilation gas of an internal combustion engine, comprising:
   a housing,
   a drivable rotor that is mounted rotatably therein, and
   a rotational drive for the rotor,
   the housing having a crude gas inlet for crankcase ventilation gas that is to be deoiled,
   a pure gas outlet for deoiled crankcase ventilation gas, and
   an oil outlet for oil precipitated from the crankcase ventilation gas,
   the housing having a multipart construction having a main element that surrounds the rotor and that bears bearings thereof, having a housing cover that contains the rotational drive, and having a housing floor that is built onto the main element from below through which at least the oil outlet runs, and
   the housing being capable of being fastened by a flange onto a counterflange of the associated internal combustion engine or of a module belonging to the associated internal combustion engine,
   the flange being fashioned on the main element and on the housing floor,
   the oil outlet running through a first flange part allocated to the housing floor and the first flange part having a circumferential rim, and
   a second flange part allocated to the main element having a collar that engages the rim from behind over at least a part of its circumference, the collar being capable of being clamped against the counterflange with interposition of the rim.

2. The centrifugal precipitator as recited in claim 1, wherein the housing floor, including its flange part having the circumferential rim, is made of plastic.

3. The centrifugal precipitator as recited in claim 1, wherein a seal is situated between the rim and the counterflange.

4. The centrifugal precipitator as recited in claim 1, wherein the flange part allocated to the housing floor has an outline whose basic shape is rectangular, and wherein the collar has a fork shape that is open at one side and that engages the rim from behind at at least two of its four sides.

5. The centrifugal precipitator as recited in claim 4, wherein the collar is open at its side that is the lower side in the installed position of the precipitator, and wherein the housing floor, for its connection to the main element, is placed onto the main element from the open side of the collar, parallel to the plane of the flange.

6. The centrifugal precipitator as recited in claim 5, wherein the main element and the housing floor have sealing elements that work together and that are mutually at least one of axially and radially sealing, and wherein the housing floor is axially clamped against the main element by a central screw.

7. The centrifugal precipitator as recited in claim 1, wherein the crude gas inlet runs through the housing floor.

8. The centrifugal precipitator as recited in claim 1, wherein a check valve is situated in the housing floor, in the course of the oil outlet.

9. The centrifugal precipitator as recited in claim 1, wherein through the housing floor there runs an oil refilling channel that on the one hand can be connected to an external oil filling port, and on the other hand is connected in terms of flow to the section of the oil outlet running through the first flange part.

10. The centrifugal precipitator as recited in claim 1, wherein the collar has an inward-pointing pressure rib whose side facing the flange, in the state in which the housing floor is fastened on the main element, is seated on the side of the rim of the housing floor facing away from the flange.

11. The centrifugal precipitator as recited in claim 1, wherein in the collar there is made a plurality of bores for clamping screws for attaching the precipitator to the counterflange, and wherein when the housing floor is installed on the main element, imaginary axial prolongations of the bores run in the direction away from the flange external to the housing floor.

12. The centrifugal precipitator as recited in claim 1, wherein the collar is fashioned as a three-dimensional structure having reinforcing webs that run in various directions.

13. The centrifugal precipitator as recited in claim 1, wherein the rotational drive for the rotor is formed by an electric motor.

14. The centrifugal precipitator as recited in claim 1, wherein a crankcase pressure regulating valve is situated in the course of the pure gas outlet and is one of connected to and build into the housing.

15. A centrifugal precipitator for the precipitation of oil mist from the crankcase ventilation gas of an internal combustion engine, comprising:
   a housing,
   a drivable rotor that is mounted rotatably therein, and
   a rotational drive for the rotor,
   the housing having a crude gas inlet for crankcase ventilation gas that is to be deoiled,
   a pure gas outlet for deoiled crankcase ventilation gas, and
   an oil outlet for oil precipitated from the crankcase ventilation gas,
   the housing having a multipart construction having a main element that surrounds the rotor and that bears lower bearings thereof, having a housing cover that contains the rotational drive, and in which an upper bearing of the rotor is situated and having a housing floor that is built onto the main element from below through which at least the oil outlet runs, and
   the housing being capable of being fastened by a flange onto a counterflange of the associated internal combustion engine or of a module belonging to the associated internal combustion engine,
   the flange being fashioned on the main element and on the housing floor,
   the oil outlet running through a first flange part allocated to the housing floor and the first flange part having a circumferential rim, and
   a second flange part allocated to the main element having a collar that engages the rim from behind over at least a part of its circumference, the collar being capable of being clamped against the counterflange with interposition of the rim.

16. The centrifugal precipitator as recited in claim 15, wherein a bearing seat for the upper bearing is situated in a metallic sleeve in the housing cover, and the lower bearing situated in a metallic sleeve in the main element.

* * * * *